Oct. 23, 1945.  C. J. HOLLAND  2,387,266
VEHICLE SUSPENSION
Filed Nov. 17, 1941
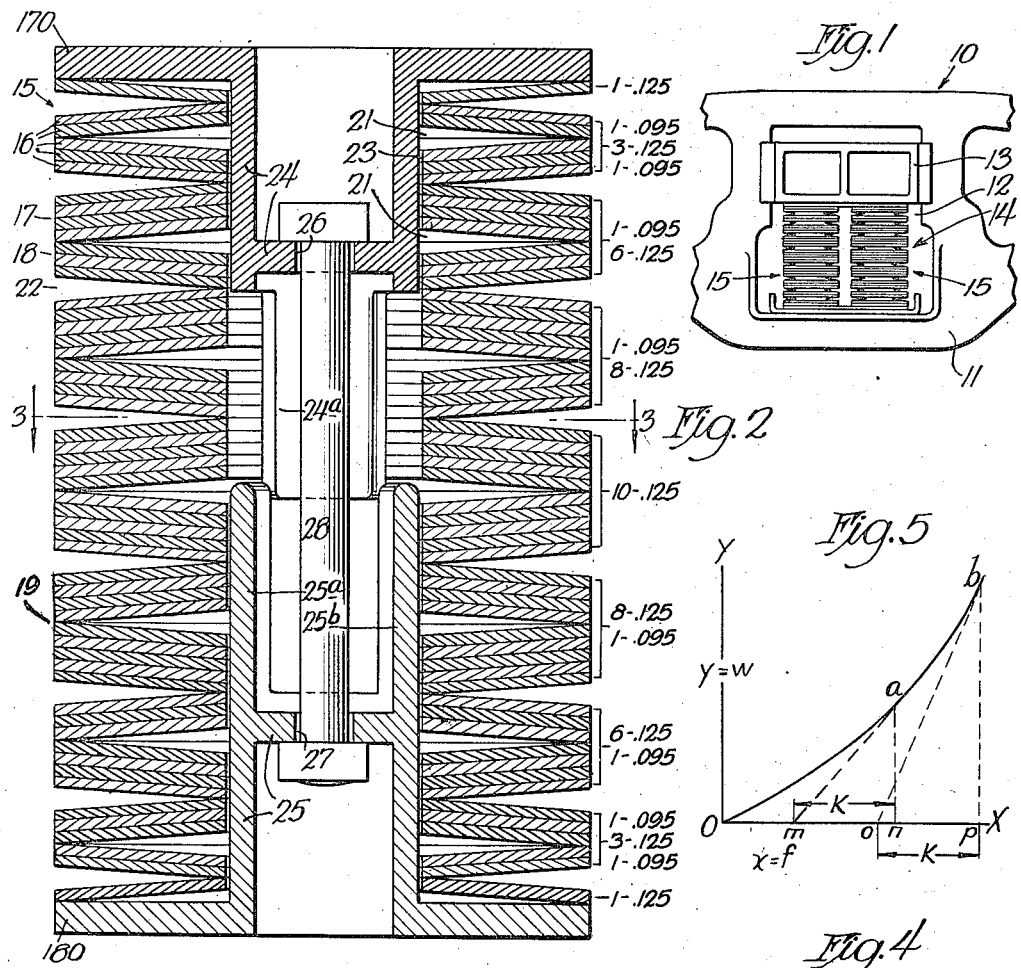
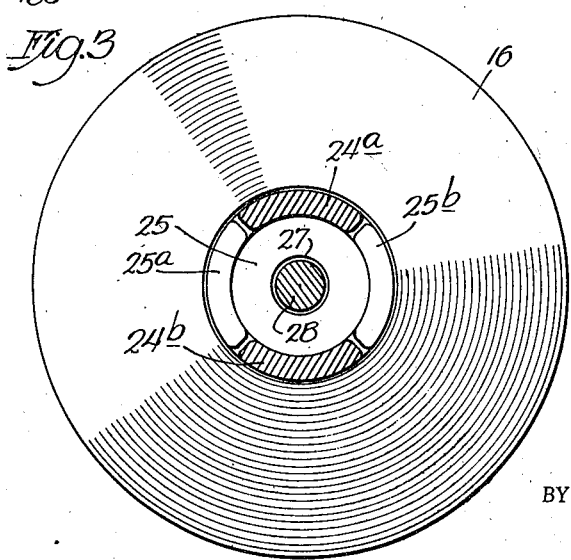
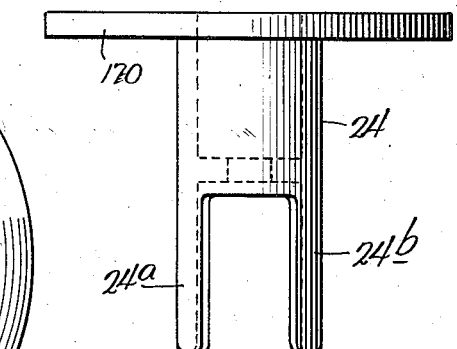
INVENTOR.
Cyrus J. Holland
BY Mann, Brown &Co.
ATTYS.

Patented Oct. 23, 1945

2,387,266

UNITED STATES PATENT OFFICE 2,387,266

VEHICLE SUSPENSION

Cyrus J. Holland, Chicago, Ill., assignor to Holland Company, a corporation of Illinois Application November 17, 1941, Serial No. 419,445

10 Claims. (Cl. 267—3)

This invention relates to spring suspension, and more particularly to spring suspension for vehicles, recoil springs for guns, and the like.

One of the objects of the invention is the provision of a new and improved disk spring unit for use in a spring suspension for resiliently supporting vehicle bodies in such manner that the suspension gives satisfactory riding qualities to the vehicle, irrespective of the load supported.

Another object of the invention is the provision of a satisfactory riding disk spring suspension in which the natural frequency of vibration of the spring suspension remains constant for variable loads.

A still further object of the invention is the provision of a new and improved disk spring suspension in which the suspension comprises springs each of which has a substantially constant effective static deflection whereby light and intermediate loads will be transported as softly or resiliently as heavy loads, and wherein the frequency of vibration for the spring assemblies of all the cars will remain constant for variable loads.

Another object of the invention is the provision of a new and improved resilient unit that is simple in construction, easily assembled, efficient in operation, and that may be readily modified to provide a spring having characteristics to accommodate various loads between different predetermined limits, as desired.

Other and further objects and advantages of the invention will appear from the following description, taken in connection with the accompanying drawing, in which:

Fig. 1 is a side elevation of a railway truck, with parts broken away and parts omitted for the sake of clearness, showing the invention in position therein;

Fig. 2 is a vertical section of the spring unit;

Fig. 3 is a section on the line 3—3 of Fig. 2;

Fig. 4 is a side elevation of one of the spring plate members; and

Fig. 5 is a graph illustrating a load deflection curve for the spring.

In the transportation of certain types of lading, such, for instance, as furniture and other comparatively light and cumbersome articles that are injured more or less seriously by rough handling in transportation, great damage to the lading of railway cars and motor trucks has resulted due to the nature of the resilient suspension employed on the vehicles.

The conventional practice is to employ stiff springs in the spring suspension. While stiff springs give a satisfactory ride for a lading that approaches the maximum load or carrying capacity of the springs, such suspension has exceedingly rough riding qualities for light loads, and where the lading is comparatively light great damage is often done to the same by springs having such characteristics. Stiff springs have a very high frequency for light loads, and it is springs of high frequency that have rough riding characteristics.

The present invention seeks to remedy this difficulty by the provision of a new and improved spring having a constant frequency which is low enough to have satisfactory riding qualities. It also contemplates springs of a constant frequency, and with a frequency such that the spring may be said to have satisfactory riding qualities.

Referring now to the drawing, the reference character 10 designates a railway truck having the side frame 11 provided with a bolster opening 12, within which is vertically slidable a bolster 13 supported by a spring assembly or spring suspension 14, as is usual in such constructions.

The spring assembly comprises a plurality of resilient units 15, embodying the invention. Each unit is built up of a plurality of convexo-concave resilient washers or spring discs 16, top and bottom spring plate members 170, 180, respectively, and a bolt engaging said spring plate members for holding the parts in assembled relation. Except for the top and bottom disc members, these members are arranged in nested groups, with the alternate groups 17, 18, having their concave sides facing in opposite directions.

The groups are arranged in what, for convenience of description, will be termed spring segments or sections 19. There are a plurality of segments, and each segment, except the upper and lower one, comprises the two groups 17, 18, of resilient discs. The discs of the group 17 have their concave faces on the lower sides, and the concave faces of the group 18 are on the upper side, so that when the groups are assembled to form a segment there will be a double convex space 21 extending around the axis of the spring unit between the two groups, which provides clearance for the resilient movement of the two groups of springs forming the segment. There is a peripheral space 22 extending around the unit between the segments. This annular double concave space affords a clearance for the resilient movement of the discs forming the spring segments.

In the form of construction shown, which is by way of example only, the discs are all of uniform exterior and interior diameters throughout the length of the spring. The unit, when assembled, has an axial opening 23 extending vertically through the same, and the plates 170, 180, are provided with inwardly extending hollow bosses 24, 25, respectively, which extend into the opening 23 from each end of the spring unit.

Suitable means are provided for holding the discs in vertical alinement during the normal operation of the unit. In the form of construction selected to illustrate one embodiment of this feature of the invention, intercalated guide members or fingers are provided for this purpose. As shown, the boss 24 has depending fingers or guide members 24a and 24b, which engage between upstanding fingers or guide members 25a and 25b, rigid with the boss 25. The fingers 24a, 24b, and 25a, 25b, are each in the form of segments of a cylinder, and when assembled as shown in Figs. 2 and 3 they are intercalated and constitute a segmental cylinder of a diameter the same as that of the bosses, which is slightly less than the interior diameter of the discs, so that the discs are held in axial alinement at all times. The fingers are of such length as to permit a maximum compression of the unit, and at the same time remain in lapping relation when the unit is expanded.

The bottom walls of the hollow bosses are provided with openings 26, 27, through which a bolt 28 extends for holding the parts in assembled relation. Preferably, though not necessarily, the bolt 28 is assembled with the spring unit under initial compression.

The discs forming the groups and segments of the spring are so constructed and arranged that the frequency of vibration of the entire unit remains substantially constant for light, intermediate and heavy loads. In other words, the effective static deflection of the spring remains constant for variable loads.

The arrangement and construction of the discs may be varied within wide limits for accomplishing this constant effective static deflection for the different loads. In Fig. 2 is given the dimensions for accomplishing this function for one set of spring characteristics. In the specific construction and arrangement of the discs that will now be described, the unit is intended to be used in railway car suspension, and in this construction the free height is limited to 9 inches.

In the form of construction shown in Fig. 2, the height of the spring was calculated as 9"; the outside diameter of the discs was calculated at 5½"; and the inside diameter at approximately 2" when the discs are compressed. The spring is designed to carry loads between 2000 pounds and 8000 pounds at a total deflection of 2¼", with a constant effective static deflection of .9375.

As determined by the particular load deflection curve hereinafter set forth, certain of the discs are of greater thickness than others in order to secure the desired characteristics of the spring. In the form of construction shown the upper and lower discs are .125" thick, as will be seen by reference to Fig. 2 of the drawing. The next segment comprises five discs, the upper group having two and the lower three. The upper and lower discs of the segment are .095" in thickness, and the other three are .125". The thicknesses of the discs of the remaining segments are indicated on the drawing, and it is not thought necessary to mention these dimensions in detail further than to call attention to the fact that the central segment comprises ten discs, five in each group, and each disc is .125" in thickness.

The arrangement of the remaining segments on opposite sides of the central segment are the same but in reverse order.

The expression "constant effective static deflection" is a constant for any particular spring embodying the invention, and may be represented on a load deflection curve diagram, as shown in Fig. 5, with the load as ordinate and deflection as abscissa. In this diagram it is represented by the length between the intercepts on the $x$-axis of the tangent to the curve at any point and the perpendicular dropped from said point to the $x$-axis, viz., the subtangent. In Fig. 5 the load deflection curve is represented by the line $oab$. The load is indicated along the line $oy$, and the deflection along the line $ox$. Take any point, as $a$, on the curve, then drop a perpendicular from that point intercepting the line $ox$ at $n$, and a tangent to the curve at $a$ intercepting the line $ox$ at $m$, then the distance $mn$ is a constant which may be designated $k$. It will be found that if from any other point, as $b$, the perpendicular to $ox$ be drawn and the tangent to the curve at that point be drawn, they will intercept the line $ox$ at $p$ and $o$, respectively, and the distance $op$ or subtangent for the point $b$ on the curve will equal $mn$ or $k$. The distance $k$, then, represents the effective static deflection of the spring.

By definition, then, the tangent at any angle between such subtangent and tangent at any point is $$\frac{y}{k}$$

which is, therefore, the first derivative of the variable function, and $$\frac{dy}{dx} = \frac{y}{k}$$

from which $$\frac{dx}{dy} = \frac{k}{y}$$

$$dx = \frac{k\,dy}{y} = k \cdot \frac{dy}{y}$$

$$x = \int k \cdot \frac{dy}{y} = k \int \frac{dy}{y}$$

Since $$\int \frac{dy}{y} = \log_e y$$

(1) $\qquad x = k \log_e y + c$

The curve thus produced applies only when the load under consideration produces a deflection equal to or greater than $k$. This means that, up to a certain point on the curve represented by minimum load, constant effective static deflection does not enter into consideration because the load will never drop into this lower portion of the curve. This point will be a horizontal distance of $k$ from the origin at zero.

In substituting the load into this formula, it must be considered that we are concerned with thousands of pounds, but that we are plotting natural logarithms of $$\frac{W}{1000}$$

if W is the load in pounds. In other words, since car loads are measured in thousands of pounds, a carload would be represented by W (the total number of pounds) divided by one thousand.

Therefore, we can state the relationship in terms of the load and deflection thus:

(2) $$f = k \log_e \frac{W}{1000} + c$$

in which $f$=deflection under any load
$k$=the constant effective "static deflection" as defined
$W$=any load in pounds
$c$=constant of integration, which varies with $W$ and with $f$ in terms of deflection from free length; that is, it is a constant which determines the location of the line on the graph with respect to the "$y$" axis
$\log_e$=logarithms according to the Naperian or hyperbolic system in which the base is 2.718281828

The spring shown in Fig. 2 was designed according to Formula 2 above, in which $$f \text{ equals } 0.29375 \left( \log_e \frac{W}{1000} \right) \text{plus } 0.2875$$

for a static deflection of 0.9375".

The dimensions given above are for the construction of a spring with certain characteristics. If those characteristics are to be different, as, for instance, if the static deflection constant is to be more or less than that given above, or the total deflection of the spring is to be more or less than the above, or the loads to be carried have different limits, then the dimensions of the discs and their arrangement in groups will be different. In order that the riding qualities shall be what may be termed soft, then the arrangement should be such that the frequency of vibration is not high, and should be substantially constant for variable loads, and will be if the spring conforms to the formula given above. There is more or less friction between the discs as the unit is compressed and expanded, and this friction will tend to prevent harmonic vibration of the spring suspension.

This application is a continuation in part of my application Serial No. 417,801, filed November 4, 1941.

The manner in which the formula $x = k \log_e y + c$ may be applied to the problem of designing a spring of the present character to meet various specifications will be readily apparent to one skilled in the art of spring design using published formulae such as may be found in the book "Springs—A Miscellany" by T. H. Sanders (London—1940).

For example, being given the required conditions, such as maximum over-all diameter, free height, load range, deflection characteristics, etc., the formula $x = k \log_e y + c$ is first used to determine whether it is possible to design a constant frequency spring meeting these conditions. If not, the computations will inform one what constant effective static deflection may be used to meet the load condition for the range of deflection specified. Then it will be necessary to make up a table from the minimum to maximum load showing the values of total deflection for selected increments of load using the same formula $x = k \log_e y + c$ to determine these values for each load increment. In practice the formula is used in the form $$f = k \log_e \frac{W}{1000} + c$$

From the values of total deflection for the selected increments of load, the designer arrives by means of the known spring formulae at the number and thickness of discs required to provide such deflection.

It is thought from the foregoing, taken in connection with the accompanying drawing, that the construction and operation of my device will be apparent to those skilled in the art, and that changes in size, shape, proportion and detail may be made without departing from the spirit and scope of the appended claims.

I claim as my invention:

1. In a spring suspension, a resilient unit comprising a plurality of spring sections, each section including two sets of nested concavo-convex disc springs, the concave side of one set facing the concave side of the cooperating set, the peripheral edge of one set engaging the peripheral edge of the cooperating set, certain of the discs being of less thickness than others, the discs being dimensioned in thickness and assembled in order in accord with the formula $x = k \log_e y + c$ in which $x$=deflection,
$k$=static deflection as defined,
$y$=load,
$c$=a constant, whereby the frequency of vibration of the unit will remain substantially constant for all loads.

2. In a resilient unit for vehicles, a plurality of groups of resilient concavo-convex disc members, said groups being arranged in pairs with the concave faces of the pairs of each group facing one another to form sections of a disc spring, certain discs in certain groups being thinner than the remaining discs in that group, and certain groups containing more discs than others, an axial opening of uniform diameter extending through all of the discs of said unit, said groups, discs and sections being dimensioned in thickness and assembled in order in accord with the formula $$x = k \log_e y + c$$

in which $x$=deflection,
$k$=static deflection as defined,
$y$=load,
$c$=a constant, thereby forming a disc spring unit having a constant frequency of vibration for variable loads.

3. In a spring suspension for vehicles comprising a plurality of sections, each intermediate section comprising two groups of concavo-convex resilient spring discs, one of said groups having said discs nested with their concave faces on their under side arranged opposite the concave faces of the other cooperating group, certain of said discs of said one group being of thicker material than the remaining discs of that group which are of thinner material, said thick and thin discs being dimensioned in thickness and assembled in order in accord with the formula $x = k \log_e y + c$ in which $x$=deflection,
$k$=static deflection as defined,
$y$=load,
$c$=a constant, whereby the frequency of the spring unit will remain constant for variable loads.

4. In a spring suspension comprising a plurality of resilient concavo-convex discs arranged in groups with a plurality of nested spring discs in each group, certain of the groups each having spring discs of the same diameter but of different thickness, said discs being dimensioned in thickness and assembled in order in accord with the formula $x = k \log_e y + c$ in which $x$ = deflection,
$k$ = static deflection as defined,
$y$ = load,
$c$ = a constant, whereby they all cooperate to provide a resilient unit having a constant effective static deflection for variable loads and with a constant period of vibration for all loads.

5. In a spring suspension for vehicles comprising a resilient unit consisting of a plurality of concavo-convex discs having its intermediate portion arranged in sections, each section comprising a pair of reversely arranged groups of nested concavo-convex discs, a plurality of discs in each group having a uniform external diameter, certain of said groups having discs of greater thickness than the remaining discs of the group, an axial opening of uniform diameter through all of said discs, a spring plate engaging each end of said unit, and intercalated guide members secured to said plates for holding said discs in vertical alinement, said discs being dimensioned in thickness and assembled in order in accord with the formula $x = k \log_e y + c$ in which $x$ = deflection,
$k$ = static deflection as defined,
$y$ = load,
$c$ = a constant, whereby they cooperate to form a spring unit having a constant frequency of vibration for variable loads.

6. In a spring suspension for vehicles, a spring unit substantially 9" in height comprising a plurality of groups of concavo-convex discs of spring metal of uniform inner and outer diameter and convexity, a single disc at each end of said unit each having its concavity facing outwardly, said groups being arranged in pairs to form sections between said end discs, each group of discs comprising a plurality of nested discs with the concavities of each group facing the corresponding group of the same section, the central section of each unit comprising two complementary groups of five discs each .125" in thickness, the sections at each side of said central section being substantially identical but reversed in order, the first section from the central section toward the upper end comprising 8 discs each .125" in thickness and 1 of .095" thickness, the second section above the central section having 6 discs of .125" thickness and 1 of .095" thickness, and the third section above the central section having 3 discs of .125" thickness and 2 of .095" thickness, an axial opening of uniform diameter through said unit, and means for retaining said discs in alinement, said discs being so arranged that the unit has a uniform period of vibration under all loads.

7. A spring assembly comprising a plurality of resilient disc members differing in spring rate in pounds per inch substantially in accord with successive increments of a load-deflection curve having the formula $x = k \log_e y + c$ in which $x$ = deflection,
$k$ = static deflection as defined,
$y$ = load,
$c$ = a constant, whereby the length of the spring assembly varies with change in load substantially in accordance with said curve and the frequency of the spring assembly is substantially constant.

8. A spring to carry a given range of loads comprising a stack of discrete resilient members of various strength to yield to the degree of becoming substantially inactive at various stages in said range of loads whereby the number of active members in said stack decreases with increasing load, said members being so selected with respect to resiliency and yield that the total yield at said stages lies at points substantially on a load-deflection curve having the formula $$x = k \log_e y + c$$

in which $x$ = deflection,
$k$ = static deflection as defined,
$y$ = load,
$c$ = a constant, whereby the frequency of vibration of the stack is substantially constant over said range of loads.

9. A spring unit to carry a given range of loads comprising a stack of resilient concave disc members differing in spring rate to substantially flatten in accord with successive increments of a load deflection curve having the formula $x = k \log_e y + c$ in which $x$ = deflection,
$k$ = static deflection as defined,
$y$ = load,
$c$ = a constant, whereby the frequency of vibration of the spring unit is substantially constant over said range of loads.

10. A spring unit to carry a given range of loads comprising a stack of separate resilient members of curved cross-sectional configuration varying in thickness to substantially flatten at various stages in said range of loads, said members being selected to substantially flatten at successive points on a load-deflection curve having the formula $x = k \log_e y + c$ in which $x$ = deflection,
$k$ = static deflection as defined,
$y$ = load,
$c$ = a constant, whereby the frequency of vibration of the spring unit is substantially constant over said range of loads.

CYRUS J. HOLLAND.